United States Patent [19]

Nadherny

[11] 4,307,670
[45] Dec. 29, 1981

[54] LATCH FOR HATCH COVERS FOR RAILWAY HOPPER CARS

[75] Inventor: Rudolph E. Nadherny, Naperville, Ill.

[73] Assignee: Illinois Railway Equipment Company, Chicago, Ill.

[21] Appl. No.: 122,614

[22] Filed: Feb. 19, 1980

[51] Int. Cl.³ .......................................... B61D 39/00
[52] U.S. Cl. .................................. 105/377; 292/256.5
[58] Field of Search ................... 105/377; 292/256.5, 292/210

[56] References Cited

U.S. PATENT DOCUMENTS

| | | | |
|---|---|---|---|
| 4,000,703 | 1/1977 | Halliar | 105/377 |
| 4,021,067 | 5/1977 | Nadherny | 105/377 |
| 4,046,082 | 9/1977 | Tedesco et al. | 105/377 |

Primary Examiner—Richard A. Bertsch
Attorney, Agent, or Firm—Lockwood, Dewey, Alex & Cummings

[57] ABSTRACT

A latch mechanism mounted on the roof of a hopper car is arranged to hold a pivoted hatch cover in closed position over a trough in the roof of the car and has outer and inner spaced flanges upstanding with respect to the roof with a keeper therebetween having a laterally and downwardly extending configuration at the top for latching engagement with an element of the cover and mounted for translatory and pivotal movement under the control of a lever which is pivotally mounted between the outer flange and keeper and provided with a lock to hold the handle of the lever in its hatch cover closing position.

6 Claims, 7 Drawing Figures

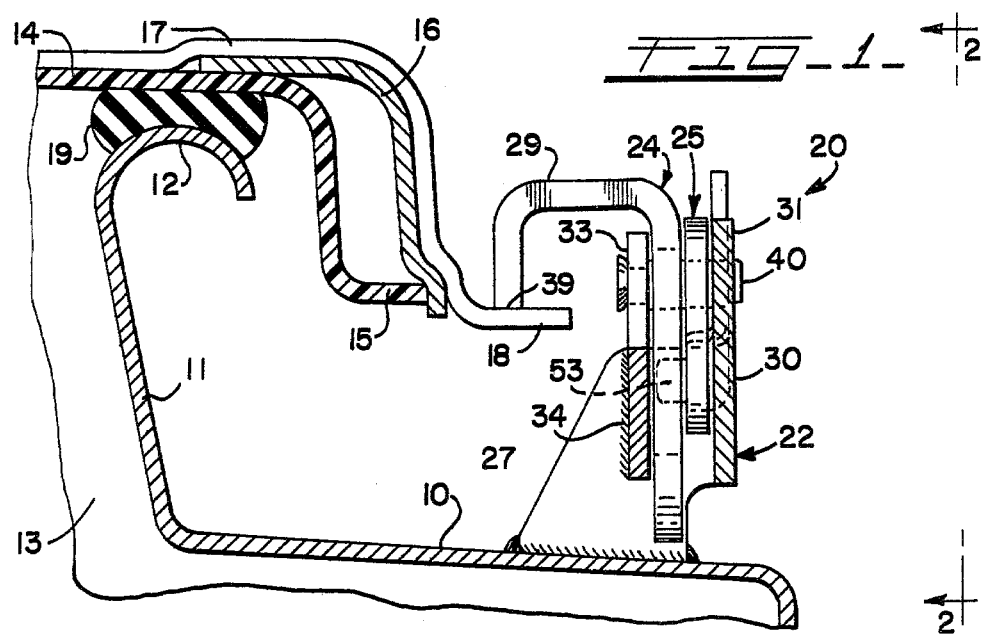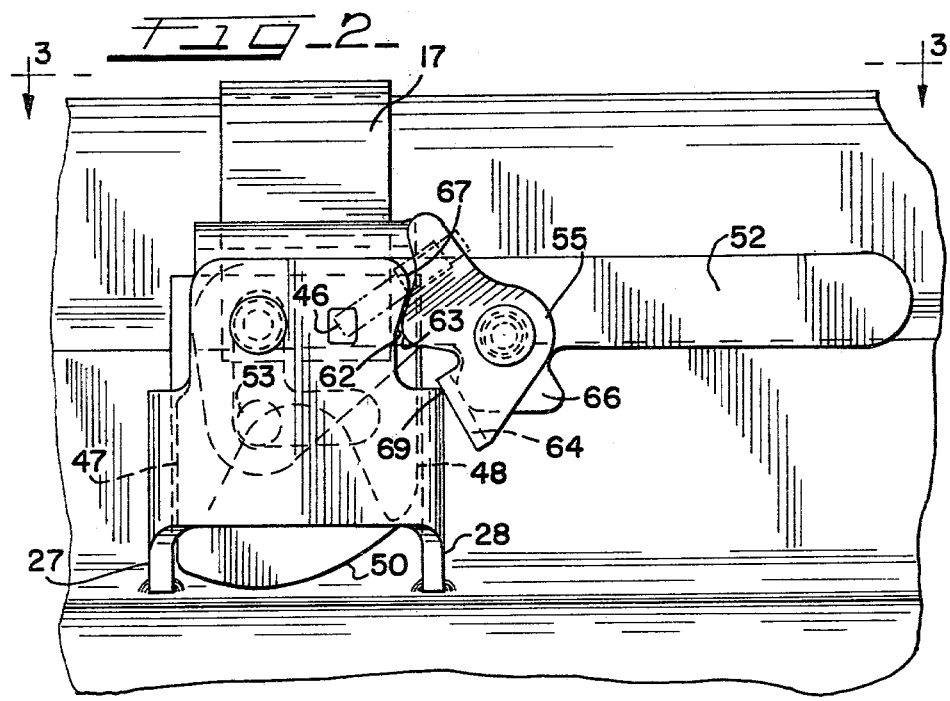

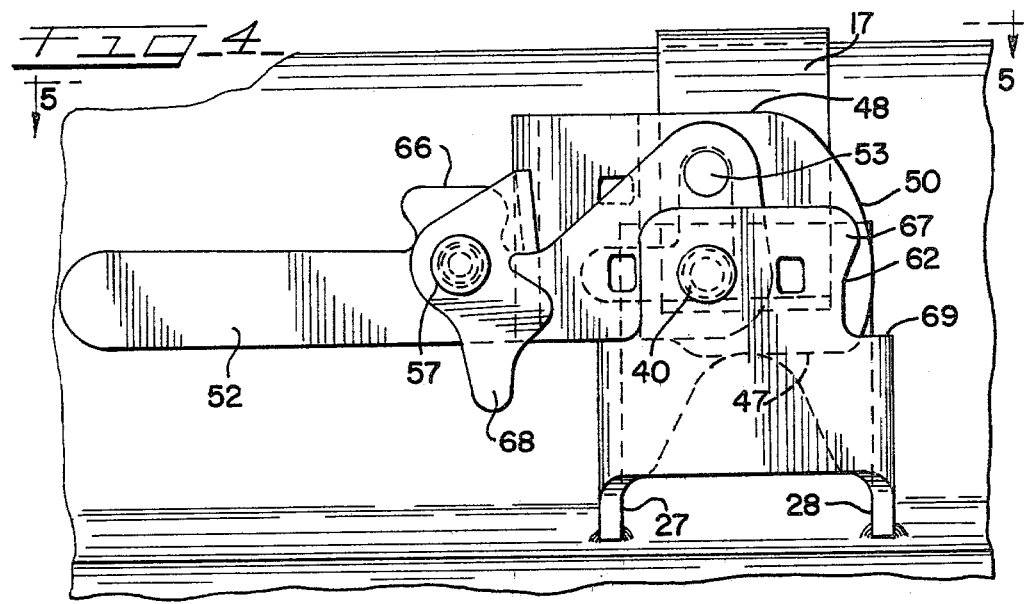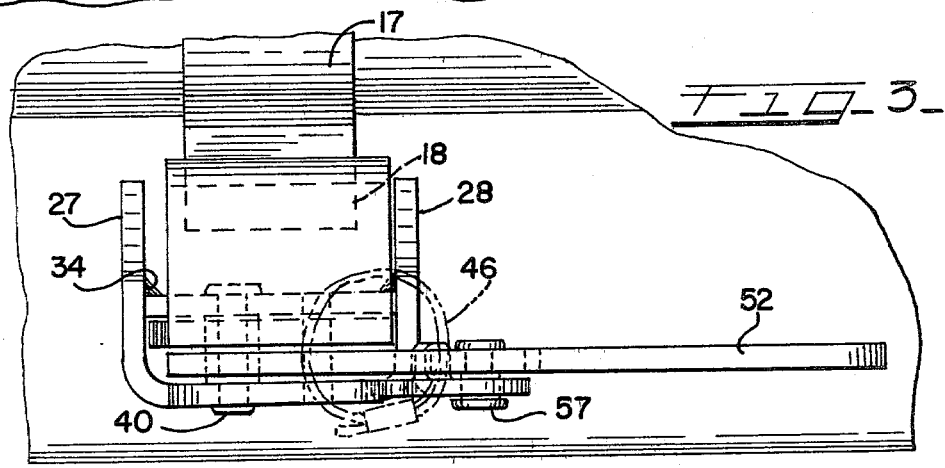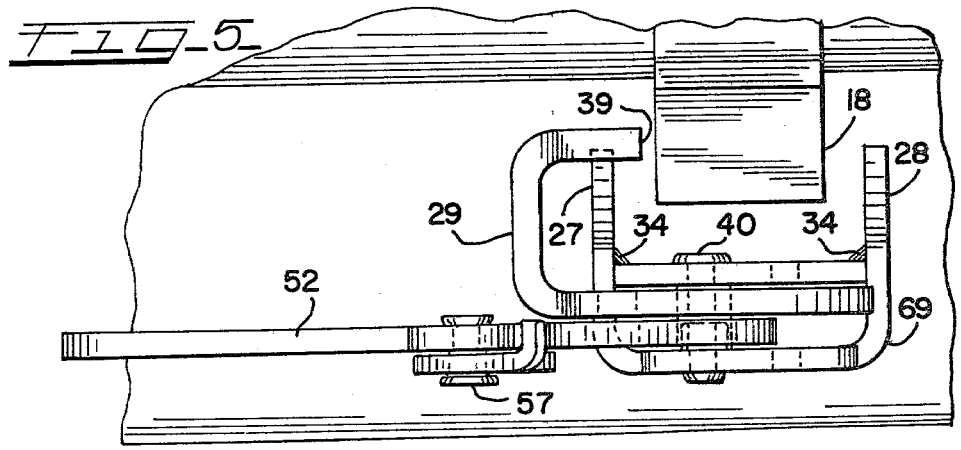

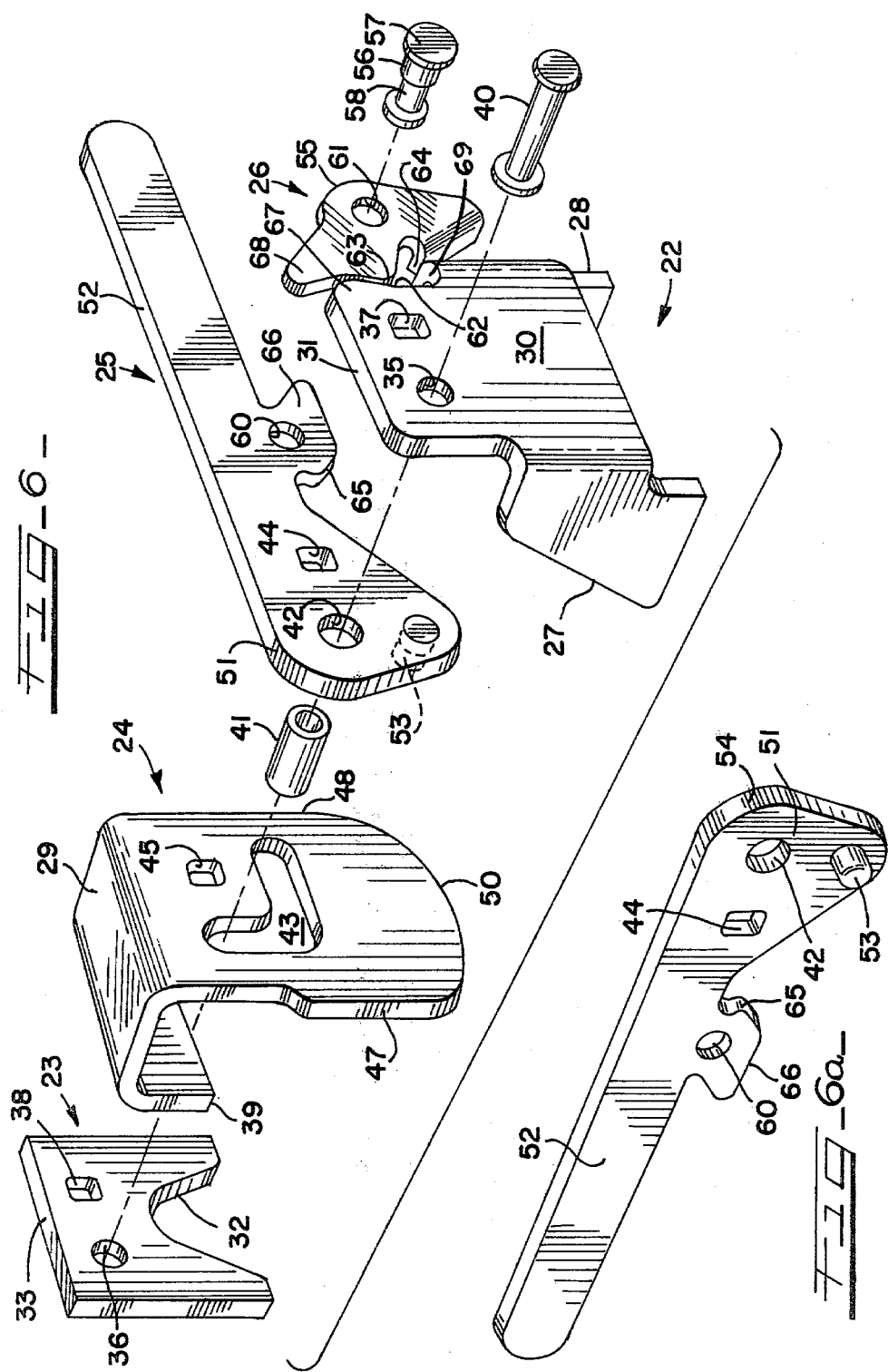

LATCH FOR HATCH COVERS FOR RAILWAY HOPPER CARS

This invention relates generally to latch mechanisms for pivoted hatch covers on railway hopper cars and has particular relation to innovations and improvements in latch constructions of the type shown and disclosed in U.S. Pat. No. 3,848,912 issued Nov. 19, 1974.

The object of this invention is to provide a latch mechanism for hatch covers for railway cars of the general type shown and described in U.S. Pat. No. 3,848,912 but substantially improved in the following respects: it is smaller and more compact; several of its components have less material and are easier to manufacture and, therefore, cheaper; the latch mechanism is easier to install; the slot in the prior inner housing member which tended to foul or clog has been eliminated along with the tongue in the prior keeper while support flanges on the new outer housing and the contour on the underside of the new keeper perform the same operation in an improved manner; the lock on the handle of the operating lever is now positive in action being forced into locking position by operation of the lever whereas in the prior construction functioning of the lock depended upon gravity; the new latch mechanism is more open on the interior; and, the holes for receiving seal bands are shaped to keep them in the proper attitude whereas round holes in prior latch constructions allowed the seal bands to pivot and assume incorrect attitudes.

For a more complete understanding of the nature and scope of the invention, reference may be had to the following detailed description of a presently preferred embodiment thereof taken in connection with the accompanying drawings wherein:

FIG. 1 is an elevational view of a latch mechanism made in accordance with the present invention and shown in the latched position with respect to the distal edge of a hatch cover for a hopper car, a portion of which is shown in section;

FIG. 2 is an elevational view taken on line 2—2 of FIG. 1;

FIG. 3 is a top plan view taken on line 3—3 of FIG. 2;

FIG. 4 is a view corresponding to FIG. 2 but showing the latch mechanism in the unlatched or open position;

FIG. 5 is a top plan view taken on line 5—5 of FIG. 4;

FIG. 6 is a perspective view showing the components of the latch mechanism of FIG. 1 in spaced or exploded relationship; and FIG. 6a is a perspective view of the operating lever of the latch mechanism taken on the opposite side from that shown in FIG. 6.

Referring to FIG. 1, a portion of the roof of a railway hopper car is indicated at 10 having integral therewith an upstanding inclined trough sidewall 11 with semi-circular upper end or lip 12. The sidewall 11 defines one side of the trough 13 in the roof 10 through which the railway car is filled or emptied. The trough 13 is arranged to be closed by a hatch cover 14 that is hinged in known manner (not shown) along its left-hand edge while the distal right-hand edge 15 thereof extends beyond the sidewall 11 as shown. The hatch cover 14 may be formed of any suitable material such as molded fiberglass. An L-shaped member 16 overlies the distal edge 15 and carries on the top thereof a latch strap 17 having a laterally extending distal end 18. A resilient compressible gasket 19 is interposed between the top of the semi-circular lip 12 and the underside of the hatch cover 14 so as to provide a seal therebetween.

The hatch cover 14 is held closed or latched, and gasket 19 maintained in compressed condition, by a plurality of latch mechanisms spaced along the roof of the car. One such latch mechanism is indicated generally at 20.

As shown in FIG. 6, the latch mechanism 20 consists of five main components, namely: an outer housing 22, an inner housing 23, a keeper 24, an operating lever 25, and a lock 26. Each of these components may be inexpensively mass-produced from steel or other suitable material by well-known shop techniques using conventional equipment.

The outer housing 22 is integrally formed so as to have a generally chair-like configuration with a pair of spaced, inwardly extending, leg flanges 27 and 28 integrally interconnected by a bight portion 30 from which projects an upstanding outer flange 31. As indicated in FIGS. 1 and 2, the feet portions of the leg flanges 27 and 28 are welded to the top surface of the car roof 10. The outer housing 22 provides the entire support for the remaining components of the latch mechanism 20 except for the lock 26 which is carried by the lever 25.

The inner housing 23 is in the form of a rectangular plate having a cutout portion 32 in the bottom and providing an upstanding inner flange portion 33. The inner housing 23 is dimensioned to fit in between the opposing faces of the leg flanges 27 and 28 to which its opposite vertical edges are welded as indicated at 34 in FIGS. 1, 3 and 5 at such an elevation that the inner flange 33 is in spaced parallel opposed relationship with the outer flange 31.

The spaced, confronting upstanding flanges 31 and 33 are provided with round pin-receiving apertures 35 and 36, respectively, and with rectangular seal band-receiving apertures 37 and 38, respectively. The aligned apertures 35 and 36 accommodate a pin 40 which is supplied with a head on one end and has a head formed on the other end by peening after installation. The pin 40 serves to pivotally support the operating lever 25 on the upstanding flanges 31 and 33 and in between the outer flange 31 and the keeper 24. The shank portion of the pin 40 passes through a bushing 41 which is sized to pivotally support the lever 25 in an aperture 42. The pin 40 and bushing 41 also project through an L-shaped slot 43 formed in the main vertical portion of the keeper 24. The lever 25 and the keeper 24 are also provided with rectangular apertures 44 and 45, respectively, which are registrable with rectangular apertures 37 and 38 when the latch mechanism 20 is in its fully closed position. In that position, the apertures 37, 38, 44 and 45 accommodate a portion of the length of a sealing band 46. As will be seen from FIG. 2, the width of the band 46 is such that it fits diagonally in the openings 37, 38, 44 and 45 and thereby the sealing band 46 is maintained in the attitude as shown in FIG. 2 since it is not free to swing or pivot to an appreciable degree.

The keeper 24 has extending from the top thereof an integral, laterally extending and downturned portion 29 so dimensioned that the bottom edge 39 of the downturned end thereof engages the upper side of the distal end 18 of the latch strap 17 as shown in FIG. 1 when the latch mechanism is closed and the gasket 19 is in its compressed condition as shown.

The vertical side edges 47 and 48, and the rounded bottom edge 50 of the keeper 24 (FIGS. 2, 4 and 6) constitute guide and camming surfaces, respectively, which cooperate with inner surfaces of the leg flanges 27 and 28, particularly of leg flange 28, as will be described.

The lever 25 has a pivoted mounted portion or nose 51 and a handle portion 52. The apertures 42 and 44 are in the pivoted nose portion 51. A cylindrical detent 53 projects from the inner side of nose 51 into the L-shaped slot 43 in keeper 24.

The interfitting relationship of the keeper 24 and the mounting portion 51 of operating lever 25 between the outer and inner upstanding flanges 31 and 33 is readily observable from FIGS. 1, 3 and 5.

The details of the handle lock 26 and the mode in which it operates will be described below following the description of the manner in which the other components of the latch mechanism 20 operate between the open and closed condition.

The latch mechanism 20 is shown in its fully closed position in FIGS. 1, 2, 3 and 6. The keeper 24 is nested in between the leg flanges 27 and 28 of the outer housing 22 with the vertical guiding edges 47 and 48, respectively, opposing the inner surfaces thereof and with the generally arcuate bottom edge 50 spaced a short distance above the car roof 10. The detent 53 is in engagement with the intersection of the legs of the L-shaped slot 43 as shown in FIG. 2 and the handle 52 extends generally horizontally toward the right as viewed in FIGS. 2, 3 and 6.

Assuming that the lock 26 is manipulated so that the lever 25 is free to operate the mechanism 20 so as to free the hatch cover 14 for pivoting to its open position, the handle 52 is grasped and rotated counterclockwise (as viewed in FIGS. 2, 3 and 6) approximately 180° to the position shown in FIGS. 4 and 5. It will be understood that during this rotation of the lever 25, the pivoted nose portion 51 of the lever rotates on the bushing 41. In this rotation of the lever 25, it will be seen that the detent 53 rotates in a semi-circle around the axis of the pin 40 and bushing 41. During this semi-circular movement, the detent 53 initially engages the upper edge of the horizontal leg of the L-shaped slot 43 (as viewed in FIGS. 2 and 6) and, thereupon, exerts a vertical thrust component onto the keeper 24. This lifting component causes the keeper 24 to rise vertically between the leg flanges 27 and 28 until such time as the vertical edge 48 rises above the opposing inner surface of the leg flange 28. At this point in the operation, the rounded bottom edge 50 will engage the inner surface of flange 28 and the detent 53 will be engaged in the closed end of the lower leg of the L-shaped slot 43 so as to apply a horizontal thrust to the keeper as well as a vertical thrust. As a result of this cooperation of parts, the initial translatory vertical movement of the keeper 24 becomes a rotational movement as the keeper 23 is rotated around the bushing 41 which now occupies the intersection of the legs of the L-shaped slot 43 (FIG. 4).

By the time the lever 25 has been rotated 180°, the adjacent edge of the handle 52 will engage the upper edge of the leg flange 27 thereby preventing further counterclockwise rotational movement. The parts now occupy the positions shown in FIGS. 4 and 5. The generally arcuate bottom edge 50 acts against the inner top edge of flange 28 to maintain the keeper 24 and lever 25 in proper alignment during both opening and closing operation of the latch mechanism 20.

It will be seen that when the keeper 24 is caused to occupy the raised and rotated open position shown in FIGS. 4 and 5, the hatch cover 14 will be free to be swung in and out of its closed position. Likewise, it will be seen that when it is desired to close the hatch cover 14 to its closed and locked position, it is manipulated first so that the gasket 19 rests on the semi-circular surface 12 and then the handle 52 of the lever 25 is grasped and rotated clockwise 180° from the position shown in FIGS. 4 and 5 to the position shown in FIGS. 1, 2, 3 and 6. This restores the components of the latch mechanism 20 to their latched or locked position.

From FIGS. 1 and 2, it can be seen that the vertical lifting force which the compressed gasket 19 applies to the keeper 24 results in little or no tendency for the lever 25 to be rotated from its locked or latched position. The bottom of the horizontal leg of the slot 43 presses upwardly on the bottom of the detent 53. However, the detent is directly underneath the pivot point of the lever 25 and, therefore, does not result in appreciable rotational movement, or tendency thereto, on the part of the lever 25. Nevertheless, it is desirable to provide the mechanism 20 with the lock mechanism 26 so that the latch 20 can be sealed in the positively closed position and prevented from being inadvertently unlatched due to vibration or accidental engagement of the handle 52. The lock mechanism 26 serves this purpose.

The lock 26 comprises a dog or pawl 55 pivotally supported on the enlarged portion 56 of a headed pin 57. The smaller diameter portion 58 of the pin extends through an aperture 60 in the lever 25 while the larger diameter portion 56 projects through an aperture 61 in the dog 55.

The side edge of the upstanding flange 31 which is adjacent the lock 26 when the mechanism 20 is latched or locked has a re-entrant surface 62 which is adapted to be engaged by a cam portion 63 of the dog 55 as shown in FIGS. 2 and 6. When the cam 63 is seated in the re-entrant surface, a laterally-turned flanged 64 of the dog 55 engages the upper outside corner of the leg flange 28. The dog 55 is brought into the position and relationship shown in FIGS. 2 and 6 when the lever 25 is rotated to the position shown in these figures. This results from engagement of a rounded cam portion 65 of a lug 66 depending from the underside of the lever 25 with the laterally-turned flange 64 on pawl 55.

As the handle 52 is moved through the final few degrees during its closing movement, the cam 63 engages the rounded corner 67 on the upstanding flange 31 and causes the dog 55 to rotate clockwise while the cam 63 rides down and around the upper portion of the corner 67. When the cam 63 reaches the place where the lower portion of rounded corner 67 merges with the upper portion of the re-entrant surface 62 the dog 55 will be free to rotate in a counterclockwise direction. In the final stages of the locking action, the flange 64 engages the corner 69 on the housing 22. Since the rounded surface 65 on the lug 66 is in engagement with the flange 64, downward movement of the lever 25 forces the flange 64 against corner 69 and in turn forces the cam 63 into the re-entrant surface 62. In this relationship of the parts, it will be seen that the lever 25 cannot be lifted until the lock mechanism 26 is released. Such release can only be accomplished by simultaneously rotating the dog 55 in a clockwise direction while lifting on the handle 52.

The dog 55 is provided with an upstanding ear portion 68 around which the seal band 46 may be applied as shown in FIG. 2 so that the lock 26 will be retained in its locked position until the seal is broken. The ear 68 also serves as a trigger to be engaged by the operator's thumb while his fingers extend underneath the handle 52. Pressing rearwardly with the thumb while lifting the fingers permits the operator to simultaneously release the lock mechanism 26 and raise the lever 52.

The opening or cut-away area 32 in the inner housing member 23 allows the free escape of foreign material which otherwise tends to collect and interfere with the free operation of the latch mechanism 20.

What is claimed as new is:

1. A latch for holding the distal edge of a hatch cover in closed position over a trough in the roof of a hopper car, comprising:
    an outer housing member having upright spaced parallel leg flanges integrally interconnected by a bight portion from which an upstanding outer flange extends, the feet of said leg flanges being adapted to be rigidly secured to the roof of said hopper car;
    an inner housing member rigidly mounted on and between said leg flanges and including an upstanding inner flange in spaced parallel opposed relationship with said outer flange on the side thereof adjacent said hatch cover distal edge;
    a keeper member having an upright plate-like main section interposed between said outer and inner flanges for guided vertical and pivotal movement therebetween, said keeper member having an L-slot within said main section and a hatch cover hold-down arm extending laterally from the top of said main section;
    a latch operating lever having a handle portion, a mounting portion interposed between said outer flange and said plate-like main section and mounted for pivotal movement on said outer and inner flanges, and a detent projecting from said mounting portion into said L-slot; and
    a pivot support pin which extends through said L-slot and co-axial apertures in said outer and inner flanges and said lever mounting portion;
    the bottom edge of said plate-like main portion of said keeper being a generally arcuate cam surface which merges upwardly with a vertical side guide edge on said main portion whereby on rotation of said lever from its hatch cover closing position said vertical side guide edge has keeper-guiding engagement with the inner surface of the adjacent one of said leg flanges so as to impart initial vertical movement to said keeper after which said arcuate cam surface has keeper-camming engagement with the inner surface of said adjacent leg flange to impart pivotal movement to said keeper, the engagement between said detent and said L-slot producing said vertical and pivotal movements.

2. The latch mechanism called for in claim 1 wherein the lower portion of said inner housing member is cut-away.

3. The latch mechanism called for in claim 1 having a lock for locking said lever in its hatch cover covered position and comprising:
    a dog pivotally mounted on said handle portion having, a cam portion adapted to move into locking engagement in a re-entrant formation on the adjacent side edge of said outer flange, and a lateral flange portion adapted to engage the upper edge of the adjacent one of said leg flanges when said cam portion has said locking engagement; and
    a lug on the underside of said handle portion for engaging said dog so as to force said lateral flange portion into said engagement with said upper edge.

4. The latch mechanism called for in claim 3 wherein said adjacent side edge of said outer flange has a rounded cover above said re-entrant formation which is engaged by said cam portion to pivot said dog and guide said cam portion into and out of said re-entrant formation, and wherein said engagement of said lateral flange portion with said upper edge pivots said dog so as to force said cam portion into lever locking engagement with said reentrant formation.

5. The latch mechanism called for in claim 4 wherein said dog has an upwardly projecting ear and releasing of said lever from its locked position requires simultaneous pressing on said ear and lifting of said lever.

6. The latch mechanism called for in claim 3 wherein said dog has an upwardly projecting ear and said outer and inner flanges, said main plate-like portion of said keeper and said mounting portion of said lever have seal band receiving apertures therein which are aligned when said latch is in its hatch cover hold-down position, said seal band receiving apertures being shaped to resist lifting movement of a seal band extending therethrough and around said ear.

* * * * *

UNITED STATES PATENT AND TRADEMARK OFFICE
CERTIFICATE OF CORRECTION

PATENT NO. : 4,307,670
DATED : December 29, 1981
INVENTOR(S) : Rudolph E. Nadherny It is certified that error appears in the above-identified patent and that said Letters Patent are hereby corrected as shown below:

Column 3, line 57 - Cancel "23" and insert -- 24 --.

Column 6, line 28 - Cancel "cover" and insert -- corner --.

Signed and Sealed this

Twentieth Day of April 1982

|SEAL|

Attest:

GERALD J. MOSSINGHOFF

Attesting Officer   Commissioner of Patents and Trademarks